(12) United States Patent
Hagita (10) Patent No.: US 7,805,556 B2
(45) Date of Patent: Sep. 28, 2010

(54) INTERRUPT CONTROL APPARATUS, BUS BRIDGE, BUS SWITCH, IMAGE PROCESSING APPARATUS, AND INTERRUPT CONTROL METHOD

(75) Inventor: Yasuharu Hagita, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 207 days.

(21) Appl. No.: 12/111,521

(22) Filed: Apr. 29, 2008

(65) Prior Publication Data

US 2008/0276027 A1 Nov. 6, 2008

(30) Foreign Application Priority Data

May 1, 2007 (JP) ............................. 2007-121129
Dec. 17, 2007 (JP) ............................. 2007-324627
Apr. 24, 2008 (JP) ............................. 2008-113974

(51) Int. Cl.
*G06F 13/24* (2006.01)
(52) U.S. Cl. ....................... 710/262; 710/264
(58) Field of Classification Search ................ 710/261, 710/262, 263, 264, 265, 266, 268, 269
See application file for complete search history.

(56) References Cited

U.S. PATENT DOCUMENTS

| 6,629,179 | B1 * | 9/2003 | Bashford ................... 710/260 |
|---|---|---|---|
| 6,823,414 | B2 * | 11/2004 | Radhakrishna ............... 710/262 |
| 7,162,559 | B1 * | 1/2007 | Kallat et al. ................. 710/262 |
| 7,398,343 | B1 * | 7/2008 | Marmash et al. ............. 710/269 |
| 2001/0032287 | A1 * | 10/2001 | Lai et al. ..................... 710/260 |
| 2005/0289271 | A1 * | 12/2005 | Martinez et al. ............. 710/260 |
| 2006/0047877 | A1 * | 3/2006 | Winkler et al. ............... 710/260 |
| 2006/0294277 | A1 * | 12/2006 | Tetrick ........................ 710/269 |
| 2007/0260796 | A1 * | 11/2007 | Grossman et al. ........... 710/269 |
| 2008/0082713 | A1 * | 4/2008 | Tsuruta ....................... 710/268 |
| 2008/0126617 | A1 * | 5/2008 | Brownlow et al. ............ 710/48 |
| 2009/0157935 | A1 * | 6/2009 | Worthington et al. ....... 710/264 |

FOREIGN PATENT DOCUMENTS

| JP | 3211212 | 4/2001 |
|---|---|---|
| JP | 2005-92770 | 4/2005 |

* cited by examiner

*Primary Examiner*—Khanh Dang
(74) *Attorney, Agent, or Firm*—Oblon, Spivak, McClelland, Maier & Neustadt, L.L.P.

(57) ABSTRACT

An interrupt control apparatus that controls an interrupt process request caused by a predetermined interrupt factor is disclosed. The interrupt control apparatus includes: an obtaining unit configured to obtain an interrupt process request signal including an interrupt factor identifier associated with at least equal to or more than two interrupt factors; an interrupt process unit configured to execute an interrupt process requested by the interrupt process request signal; and a control unit configured to control the interrupt process unit so as not to execute interrupt processes caused by interrupt factors associated with the interrupt factor identifier until the interrupt process executed by the interrupt process unit ends.

13 Claims, 11 Drawing Sheets

| 0 | A |
|---|---|
| 1 | B |
| 2 | C |
| 3 | D |
| 4 | E |
| 5 | F |
| 6 | G |
| 7 | H |
| 8 | I |
| 9 | J |
| 10 | K |
| 11 | L |
| 12 | M |
| 13 | N |
| 14 | O |
| 15 | P |
| 16 | - |
| 17 | Q |
| 18 | R |
| 19 | S |
| 20 | T |
| 21 | - |
| 22 | U |
| 23 | V |
| 24 | W |
| 25 | X |
| 26 | Y |
| 27 | Z |
| 28 | α |
| 29 | β |
| 30 | σ |
| 31 | δ |

| IRC_STAT bit | FACTOR NAME | NUMBER OF MSI MESSAGES | | | | | |
|---|---|---|---|---|---|---|---|
| | | 32 | 16 | 8 | 4 | 2 | 1 |
| 31 | δ | 31 | 15 | 7 | 3 | 1 | 0 |
| 30 | σ | 30 | 14 | 6 | 2 | 0 | 0 |
| 29 | β | 29 | 13 | 5 | 1 | 1 | 0 |
| 28 | α | 28 | 12 | 4 | 0 | 0 | 0 |
| 27 | Z | 27 | 11 | 3 | 3 | 1 | 0 |
| 26 | Y | 26 | 10 | 2 | 2 | 0 | 0 |
| 25 | X | 25 | 9 | 1 | 1 | 1 | 0 |
| 24 | W | 24 | 8 | 0 | 0 | 0 | 0 |
| 23 | V | 23 | 7 | 7 | 3 | 1 | 0 |
| 22 | U | 22 | 6 | 6 | 2 | 0 | 0 |
| 21 | - | 21 | 5 | 5 | 1 | 1 | 0 |
| 20 | T | 20 | 4 | 4 | 0 | 0 | 0 |
| 19 | S | 19 | 3 | 3 | 3 | 1 | 0 |
| 18 | R | 18 | 2 | 2 | 2 | 0 | 0 |
| 17 | Q | 17 | 1 | 1 | 1 | 1 | 0 |
| 16 | - | 16 | 0 | 0 | 0 | 0 | 0 |
| 15 | P | 15 | 15 | 7 | 3 | 1 | 0 |
| 14 | O | 14 | 14 | 6 | 2 | 0 | 0 |
| 13 | N | 13 | 13 | 5 | 1 | 1 | 0 |
| 12 | M | 12 | 12 | 4 | 0 | 0 | 0 |
| 11 | L | 11 | 11 | 3 | 3 | 1 | 0 |
| 10 | K | 10 | 10 | 2 | 2 | 0 | 0 |
| 9 | J | 9 | 9 | 1 | 1 | 1 | 0 |
| 8 | I | 8 | 8 | 0 | 0 | 0 | 0 |
| 7 | H | 7 | 7 | 7 | 3 | 1 | 0 |
| 6 | G | 6 | 6 | 6 | 2 | 0 | 0 |
| 5 | F | 5 | 5 | 5 | 1 | 1 | 0 |
| 4 | E | 4 | 4 | 4 | 0 | 0 | 0 |
| 3 | D | 3 | 3 | 3 | 3 | 1 | 0 |
| 2 | C | 2 | 2 | 2 | 2 | 0 | 0 |
| 1 | B | 1 | 1 | 1 | 1 | 1 | 0 |
| 0 | A | 0 | 0 | 0 | 0 | 0 | 0 |

FIG.11

INTERRUPT CONTROL APPARATUS, BUS BRIDGE, BUS SWITCH, IMAGE PROCESSING APPARATUS, AND INTERRUPT CONTROL METHOD

BACKGROUND OF THE INVENTION

1. Field of the Invention

The present invention relates to an interrupt control apparatus, a bus bridge, a bus switch, an image processing apparatus and an interrupt control method in a system such as PCI-Express (to be referred to as "PCIe" hereinafter) in which interrupt notification is performed by packet transfer or by edge interrupt.

2. Description of the Related Art

As a conventional technique, a technique is proposed for reducing a number of terminals by sharing interrupt input lines in a device having a plurality of PCI buses (refer to Japanese Laid-Open Patent Application No. 2005-092770, for example). In addition, a technique is proposed in which an interrupt control unit selects an interrupt when transmitting it to an upper device, and invalidates and discards input and output interrupt packets under resetting (refer to Japanese Laid-Open Patent Application No. 10-149293, for example).

In the following, an interrupt control method of the PCIe bus is described. The PCIe bus does not have a specific interrupt signal, and requests an interrupt using a packet. The packet for interrupt is called a MSI (Message Signaled Interrupt) packet. Interrupt factors can be classified to 32 types at the maximum using a message number that is embedded in the MSI packet so that 32 types of interrupt factors can be notified at the maximum.

A number of message numbers (number of MSI messages) that can be embedded in MSI packets is set by a PCIe configuration cycle when the system is launched. In the PCIe standard, there are six kinds of the number of MSI messages, which are 32, 16, 8, 4, 2 and 1. The system determines which is to be selected. For example, when "number of MSI messages=32" is selected, a device that can transmit MSI packets using 32 MSI message numbers can transmit a MSI packet embedding a message number that is any one of 32 kinds of numbers (0-31).

In addition, when "number of MSI messages=16" is selected, the device that can transmit MSI packets using 32 MSI message numbers assigns a same message number to two factors to transmit a MSI packet. When "number of MSI messages=8" is selected, a device that can transmit MSI packets using 32 MSI message numbers assigns a same message number to four factors to transmit a MSI packet.

When "number of MSI messages=4" is selected, a device that can transmit MSI packets using 32 MSI message numbers assigns a same message number to eight factors to transmit a MSI packet. When "number of MSI messages=2" is selected, a device that can transmit MSI packets using 32 MSI message numbers assigns a same message number to 16 factors to transmit a MSI packet. In addition, when "number of MSI messages=1" is selected, a device that can transmit MSI packets using 32 MSI message numbers assigns a same message number to all (32) factors to transmit a MSI packet.

However, according to the interrupt control method of the PCIe bus of the above-mentioned conventional technique, when 16, 8, 4, 2 or 1 is selected as the number of MSI message numbers, a same message number is assigned to a plurality of interrupt factors. When a MSI packet in which a same message number is embedded is issued a number of times, there is a problem in that traffic of the PCIe bus increases so that performance of the device may be lowered.

SUMMARY OF THE INVENTION

For solving the above-mentioned problem, an object of the present invention is to provide a technique that can suppress redundant interrupt processes (transmission of MSI packets).

To achieve the above object, according to an embodiment of the present invention, an interrupt control apparatus that controls an interrupt process request caused by a predetermined interrupt factor is provided. The interrupt control apparatus includes:

an obtaining unit configured to obtain an interrupt process request signal including an interrupt factor identifier associated with at least equal to or more than two interrupt factors;

an interrupt process unit configured to execute an interrupt process requested by the interrupt process request signal; and a control unit configured to control the interrupt process unit so as not to execute interrupt processes caused by interrupt factors associated with the interrupt factor identifier until the interrupt process executed by the interrupt process unit ends.

According to the embodiment of the present invention, redundant interrupt processes can be suppressed, so that it can be avoided to degrade performance of the device.

BRIEF DESCRIPTION OF THE DRAWINGS

Other objects, features and advantages of the present invention will become more apparent from the following detailed description when read in conjunction with the accompanying drawings, in which.

DETAILED DESCRIPTION OF THE PREFERRED EMBODIMENTS

In the following, preferred embodiments of an interrupt control apparatus, a bus bridge, a bus switch, an image processing apparatus, and an interrupt control method according to the present invention are described in detail with reference to attached drawings. By the way, in the following description, although the type of the interrupt packet is limited to the MSI packet, the present invention can be applied to any system that transmits an interrupt using a packet (including edge interrupt, in a broad sense).

Embodiment

Figure 1:
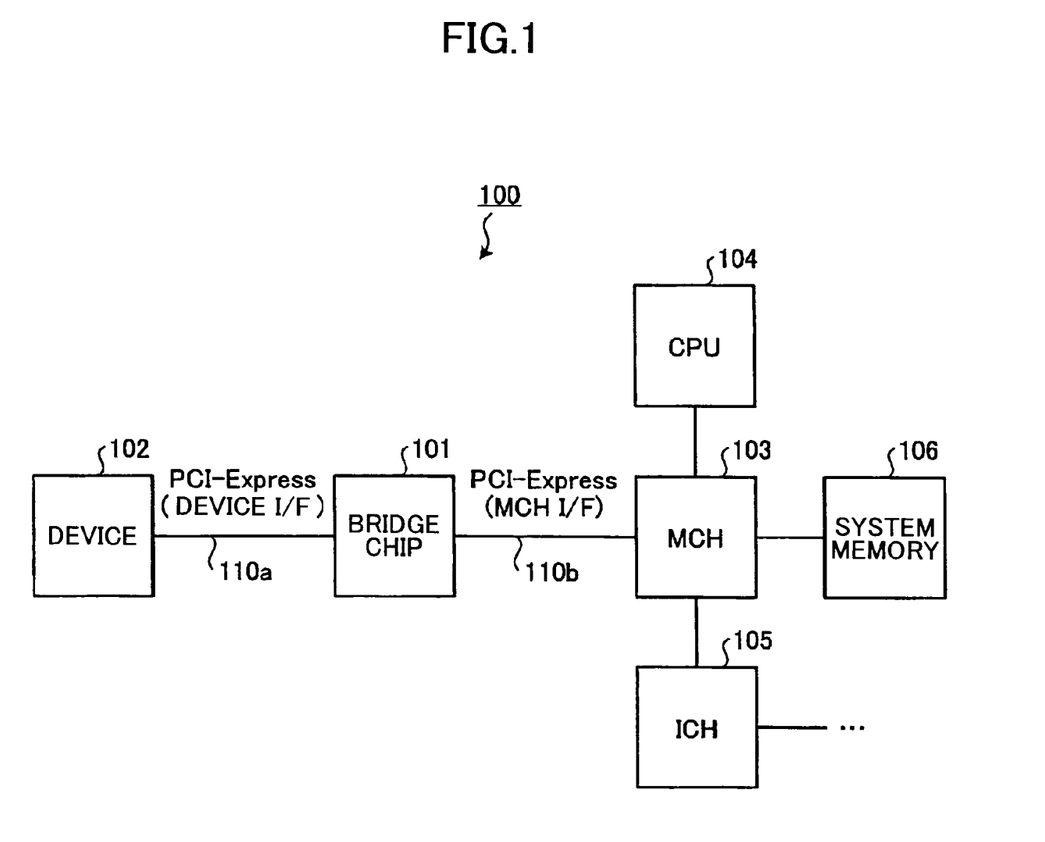
FIG. 1 is a block diagram showing an example of a system configuration on which the bridge chip of the present embodiment is mounted.

First, a configuration example of a system on which a bridge chip of an embodiment is mounted is described. FIG. 1 is a block diagram showing an example of a system configuration on which the bridge chip of the embodiment is mounted. The system 100 includes a bridge chip 101, a device 102, a MCH (Memory Controller Hub) 103, a CPU 104, an ICH (I/O Controller Hub) 105 and a system memory 106.

The bridge chip 101 is a printer controller including various functions such as a compandor, an editing unit and a rotation unit, for example. The device 102 is a printer engine, for example, and is a PCIe lower device of the bridge chip 101. In addition, the MCH 103 is a north bridge chip of a x86 system, and is a PCIe upper device of the bridge chip 101. In addition, the ICH 105 is a south bridge chip of the x86 system.

The device 102 and the bridge chip 101 are connected by the PCIe bus 110a, and the MCH 103 and the bridge chip 101 are connected by the PCIe bus 110b. In the following, the PCIe bus 110 that connects between the device 102 and the bridge chip 101 is referred to as a device I/F 110a. In addition, the PCIe bus 110 that connects between the MCH 103 and the bridge chip 101 is referred to as a MCH I/F 110b.

Next, a configuration example of an image processing apparatus 150 is described with reference to FIG. 2 as another example of a system on which a bus bridge of an embodiment is mounted.

Figure 2:
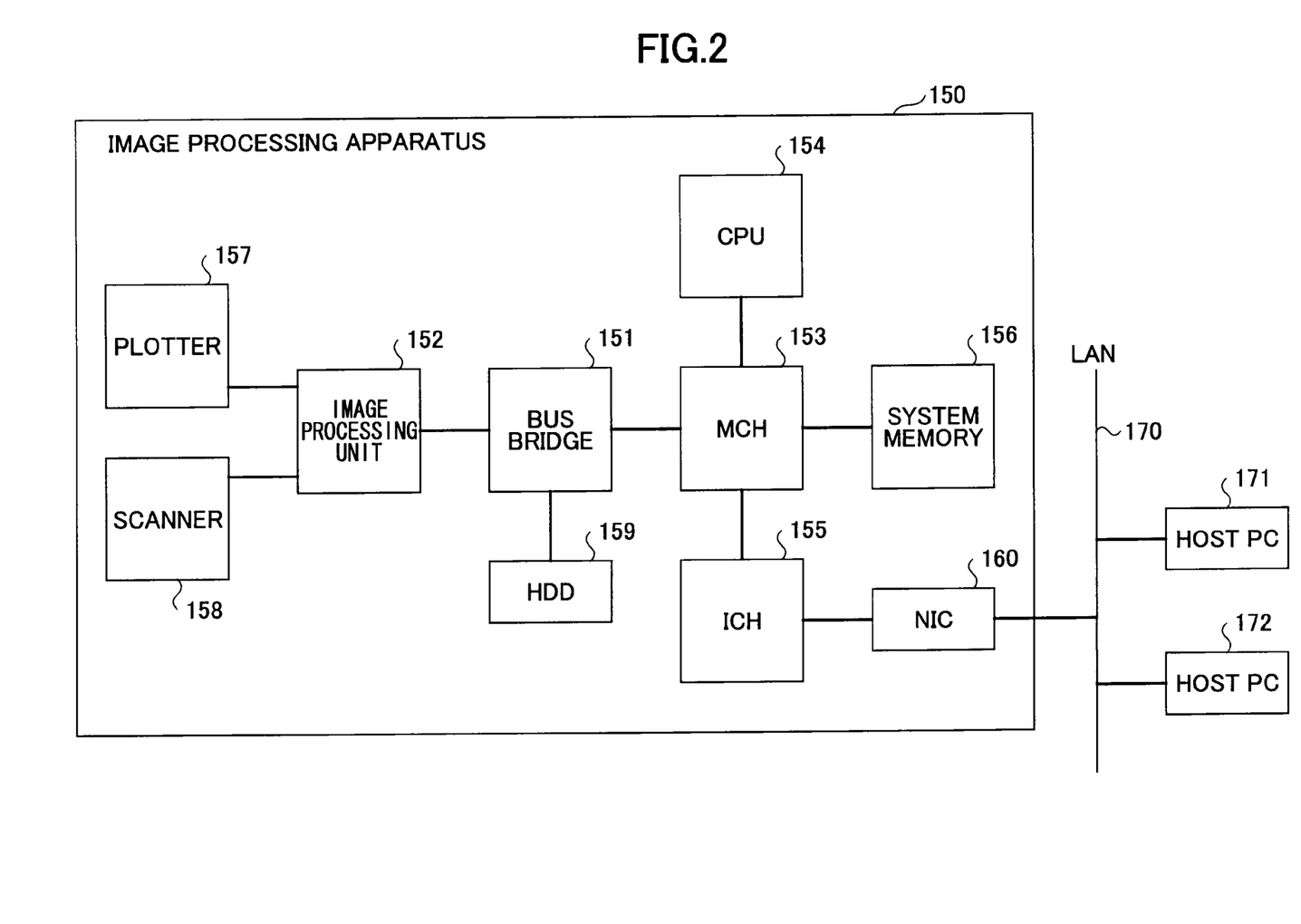
FIG. 2 is a block diagram showing an example of an image processing apparatus on which the bus bridge of the present embodiment is mounted.

As shown in FIG. 2, the image processing apparatus 150 includes a bus bridge 151, an image processing unit 152, a MCH (Memory Controller Hub) 153, a CPU 154, an ICH (I/O Controller Hub) 155, a system memory 156, a plotter 157, a scanner 158, a HDD (Hard Disk Drive) 159, and a NIC (Network Interface Card) 160. In the example shown in FIG. 2, the image processing apparatus 150 is connected to a LAN 170. In addition, a host PC 171 and a host PC 172 are connected to the LAN 170.

The bus bridge is an apparatus similar to the bridge chip in the configuration shown in FIG. 1. The bus bridge 151 includes, in addition to an interrupt control unit (INTC) based on the present invention, a compression and expansion module, a HDD I/F module, and a bridge function for bridging between an I/F to the image processing unit 152 and an I/F to the MCH.

For example, the bus bridge 151 receives scanner data from the image processing unit 152 and transfers the scanner data to the system memory 156 via the MCH 153, and transfers plotter data read from the system memory 156 to the image processing unit 152 via the MCH 153.

The image processing unit 152 performed image processing for scanned data and image processing for plotter data, and transfers various data to the bus bridge 151. The HDD 159 stores image data. The plotter 157 is an apparatus for printing image data. The scanner 158 is an apparatus for generating image data by reading an image. The NIC 160 is an apparatus having an interface function between the LAN 170 and the image processing apparatus 150. The CPU 154, the MCH 153, the ICH 155 and the system memory 156 correspond to the CPU 104, the MCH 103, the ICH 105 and the system memory 106 respectively.

Next, operation of the image processing apparatus 150 is described.

First, the image processing apparatus 150 receives PDL (Page Description Language) data from the host PC (171 or 172). The PDL data is transferred to the system memory 156 via the NIC 160, the ICH 155 and the MCH 153. Then, the CPU 154 expands the PDL data into image data to store the data into the system memory 156 again.

When the system memory 156 cannot store the whole image data, or when the image data is to be reused by storing, the image data is transferred to the HDD 159 via the MCH 153 and the bus bridge 151. In this example, the image data is compressed by the bus bridge 151, so that the compressed image data is stored in the HDD 159.

The image data stored in the HDD 159 is expanded by the bus bridge 156 so as to be transferred to the system memory 156. Then, the bus bridge 151 reads the image data from the system memory 156 to transfer the image data to the image processing unit 152. The image processing unit 152 sends the image data to the plotter 157, so that the plotter prints the image on a paper.

In the series of processes, the bus bridge 151 binds interrupts of the compression module, the expansion module and the image processing unit 152 and the like to report interrupts to the CPU 154 via the MCH 153. For example, the bus bridge 151 notifies the CPU 154 of completion of compression/expansion using an interrupt, so that the CPU 154 can issue compression/expansion instruction for next image data. In addition, as to data transmission between the bus bridge 151 and the image processing unit 152, timing can be adjusted using an interrupt from the bus bridge 151.

In the following, although configuration and processes relating to interrupt control of the present embodiment are described based on the configuration of FIG. 1, the configuration and processes described in the following can be similarly applied to the configuration described with reference to FIG. 2.

Figure 3:
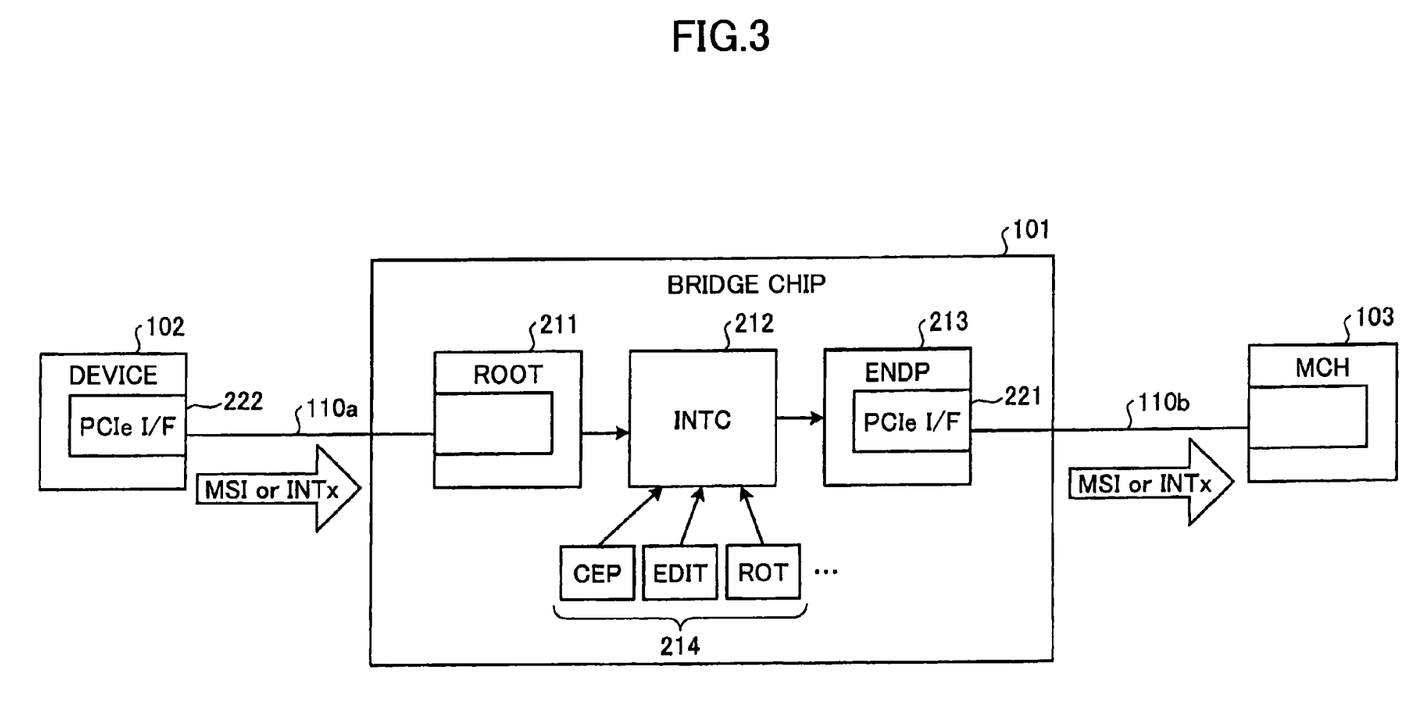
FIG. 3 is a block diagram showing configurations of the bridge chip and its peripheral part.

Next, detailed configuration of the bridge chip 101 and the peripheral part are described. FIG. 3 is a block diagram showing a configuration of the bridge chip and the peripheral part. The bridge chip 101 includes a ROOT 211, an INTC 212, an ENDP 213 and function modules 214.

The ROOT 211 is a Root Complex function module managing an interface with a lower device. The INTC 212 is an interrupt controller to bind interrupt factors from the function modules 214 and the ROOT 211 to send an issue request of a MSI packet to the ENDP 213. The ENDP 213 is an end point function module responsible for an I/F to an upper device. The function modules 214 are a group of modules that can be interrupt factors other than the ROOT 211. The function modules 214 include CEP, EDIT, ROT and the like, for example.

The ENDP 213 is provided with a PCIe I/F 221, and is connected to the MCH 103 via the MCH I/F 10b. In addition, the device 102 is also provided with the PCIe I/F 222, and is connected to the ROOT 211 via the device I/F 110a.

The device I/F 110a supports both of MSI and ITNx message (to be referred to as ITNx hereinafter) as schemes for transmitting an interrupt request to be transferred to the bridge chip 101 from the device 102. There are MSI and ITNx as methods for transmitting the interrupt request, and which scheme is to be used is set by a PCIe configuration of the device 102 when the system is launched. In addition, the number of MSI messages is set by the PCIe configuration of the device 102 performed when the system is launched. The number of MSI messages is selected from six numbers of 1, 2, 4, 8, 16 and 32.

Also as to the MCH I/F 110b, the device I/F 110b supports both of MSI and ITNX as schemes for transmitting an interrupt request to be transferred to the MCH 103 from the bridge chip 101. Which scheme is to be used is set by a PCIe configuration of the ENDP 213 when the system is launched. In addition, the number of the MSI messages is set by the PCIe configuration of the device 102 performed when the system is launched. The number of the MSI messages is selected from six numbers of 1, 2, 4, 8, 16 and 32.

Figure 4:
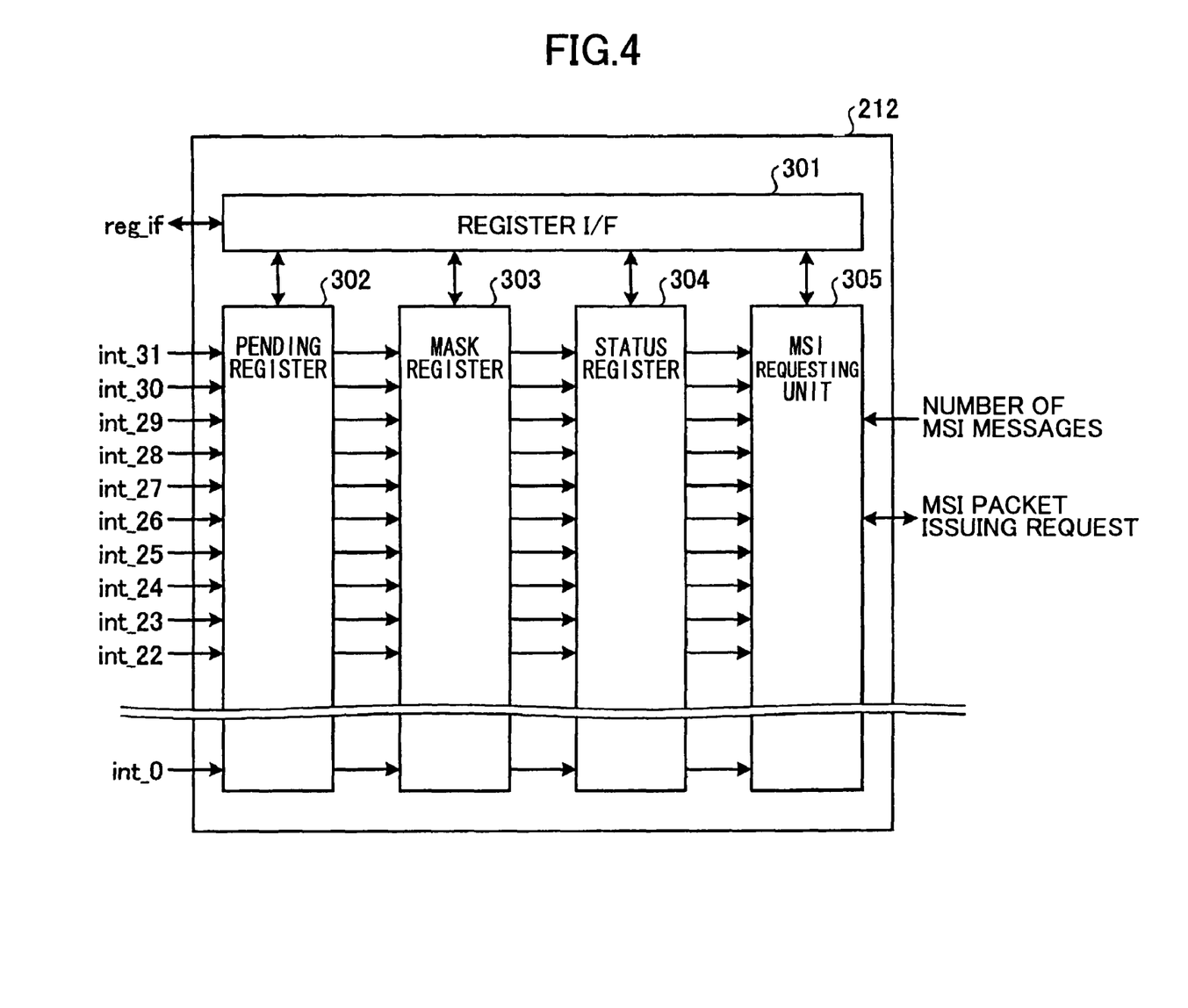
FIG. 4 is a block diagram showing a configuration of the INTC.

Next, a configuration of the INTC 212 that is an interrupt controller in the bridge chip 101 is described. FIG. 4 is a block diagram showing a configuration of the INTC. FIG. 4 shows a case in which there are 32 kinds of interrupt factors. The register I/F 301 intermediates access to a register in each module of the INTC 212. The pending register (IRC_PEND) 302 is a group of registers for indicating statuses of each interrupt factor (int[31:0]) input into the INTC 212. The mask register (IRC_MSK) 303 is a group of registers for masking interrupts of each interrupt factor (int [31:0]).

Figure 5:
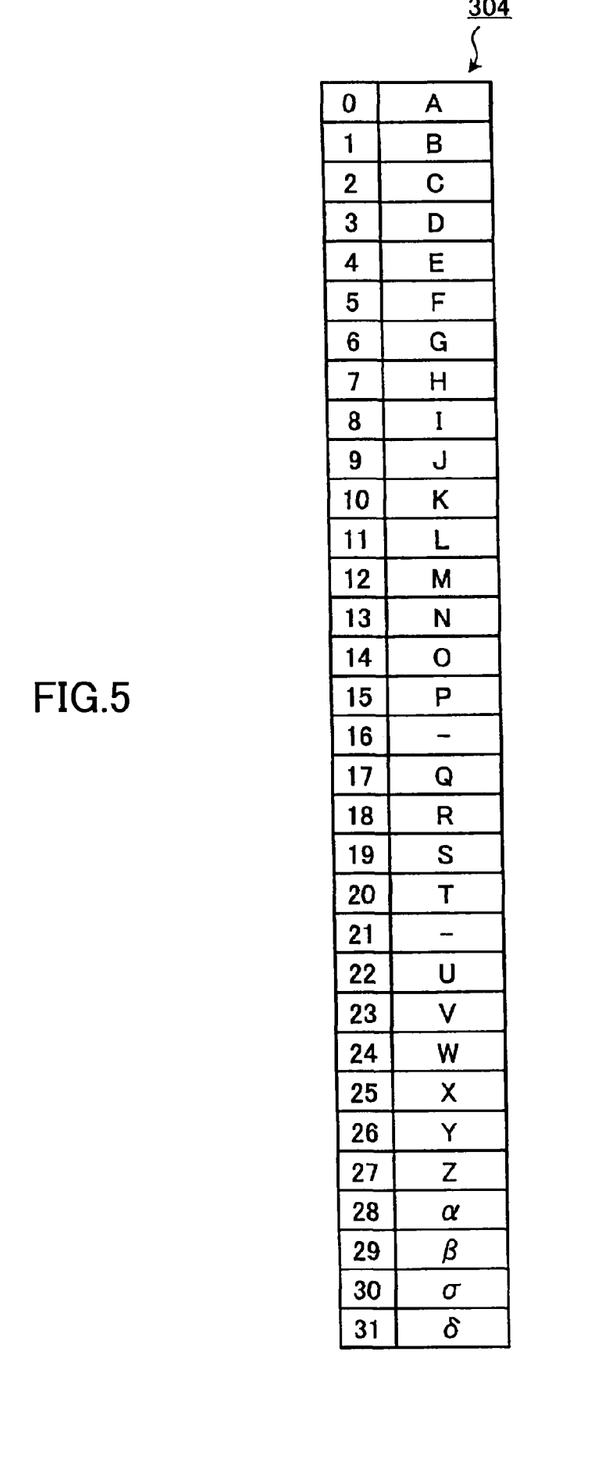
FIG. 5 is a schematic diagram showing a configuration example of the status register.

The status register (IRC_STAT) 304 is a group of registers for indicating statuses of interrupt factors after the interrupt factors are masked by the mask register 303. FIG. 5 shows a configuration example of the status register 304. The status register 304 has 32 bit width in which an interrupt factor (A, B etc. in FIG. 5) is assigned to each bit. By the way, there may be a bit to which no factor is assigned.

Returning to FIG. 4, the MSI requesting unit (MSI_REQ) 305 is a module for sending an issuing request of a MSI packet to the PCIe I/F 221 provided in the ENDP 213 in the side of the MCH 103 (refer to FIG. 3). The MSI requesting unit 304 receives a number of permitted message numbers (number of MSI messages) from the PCIe I/F 221. The MSI requesting unit 305 sends an issuing request of MSI to the MCH I/F 110b.

(Flow of Interrupt Signal in the Periphery of the INTC 212)

Next, flow of an interrupt signal around the INTC 212 is described. In the following description, although processes between the bridge chip 101 and the MCH 103 (processes in MCH I/F 110b) are mainly described, similar processes are also applied to processes between the bridge chip 101 and the device 102 (processes in device I/F 110a).

Figure 6:
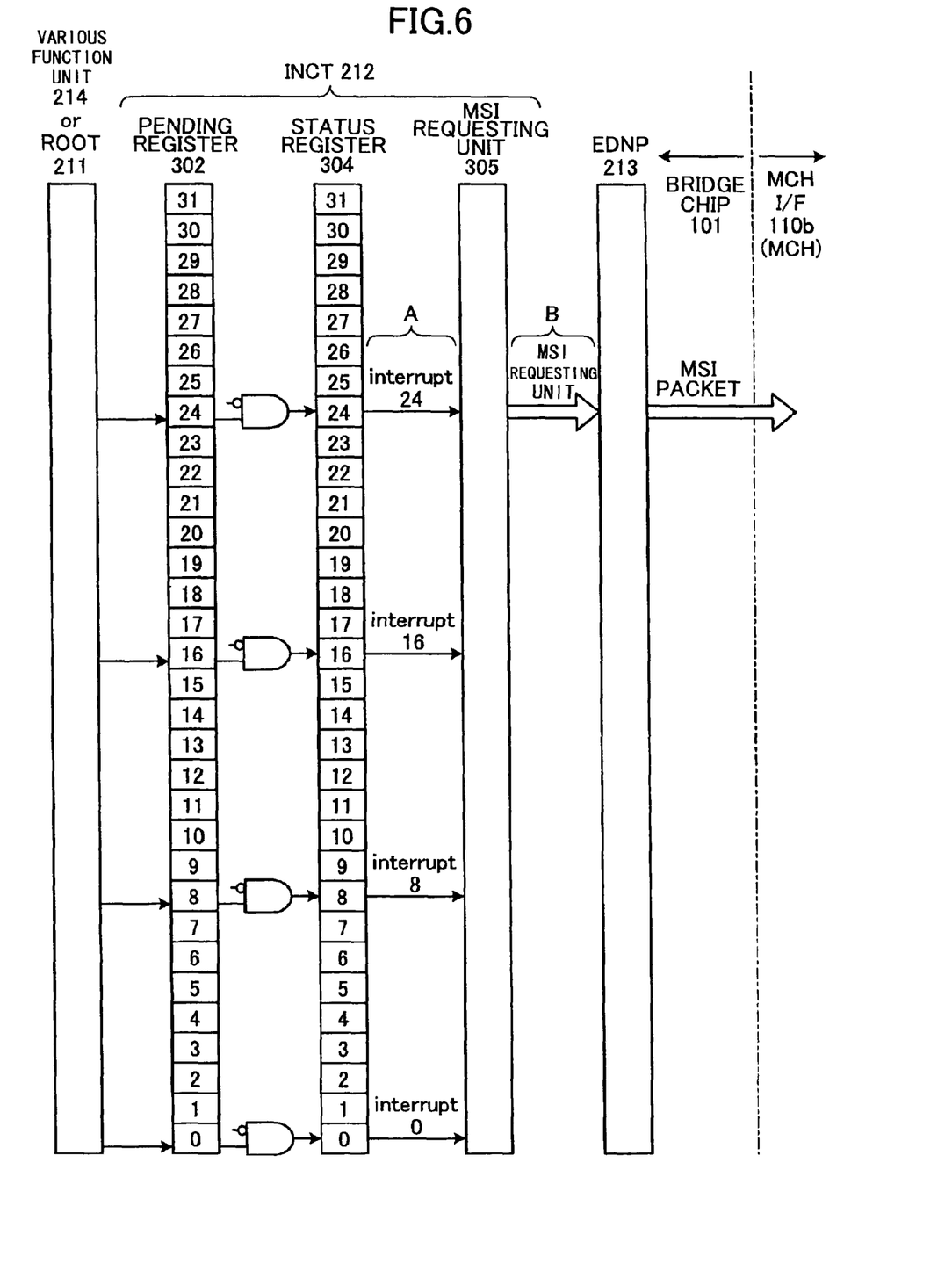
FIG. 6 is a schematic diagram for describing flow of an interrupt signal in the peripheral part of the INTC.

FIG. 6 is a schematic diagram for describing flow of an interrupt signal around the INTC. In FIG. 6, it is assumed that a signal flows from left to right. In addition, FIG. 6 shows a case in which the number of MSI messages is 8. In FIG. 6, although the mask register 303 is not shown, a part of mask gates is shown between the pending register 302 and the status register 304. First, a signal is received from the ROOT 211 or from the function module 214 via the register I/F 301 (refer to FIG. 4). When the state is H enable, when an interrupt occurs, a corresponding bit of the pending register 302 becomes H.

When "1" is written in a corresponding bit of the mask register 303 (refer to FIG. 4), transmission of "H" from the pending register 302 to the status register 304 is prohibited by the mask gate (interrupt mask). On the other hand, when "0" is written in the corresponding bit of the mask register 303, "H" of the pending register 302 is transmitted to the status register 304 via the mask gate (non interrupt mask). The status of the status register 304 is transmitted to the MSI requesting unit 305.

The MSI requesting unit 305 requests the PCIe I/F 221 of the ENDP 213 to issue a MSI packet according to the status of the status register 304 and the number of MSI messages received from the PCIe I/F 221 of the ENDP 213. The number of MSI messages is a 5 bit signal, and a result of multiple message enable (refer to PCI Local Bus Specification) is transmitted to the INTC 212.

In the case when the number of MSI messages is 32, for example, when a signal (A in FIG. 6) output from a bit in the status register 304 is "H", the MSI requesting unit 305 requests the ENDP 213 to issue a MSI packet in which a message number corresponding to the bit number is embedded. In addition, as shown in FIG. 6, when the number of MSI messages is 8, the MSI requesting unit 305 classifies signals output from each bit of the status register 304 into 8 groups, so that the MSI requesting unit 305 requests the ENDP 213 to issue a MSI packet in which any of 8 kinds of message numbers is embedded.

In this case, the MSI requesting unit 305 classifies signals into groups as follows, for example:

{bit31, bit23, bit15, bit7}=a group of MSI message number 7; {bit30, bit22, bit14, bit6}=a group of MSI message number 6; {bit29, bit21, bit13, bit5}=a group of MSI message number 5; {bit28, bit20, bit12, bit4}=a group of MSI message number 4; {bit27, bit19, bit11, bit3}=a group of MSI message number 3; {bit26, bit18, bit10, bit2}=a group of MSI message number 2; {bit25, bit17, bit9, bit1}=a group of MSI message number 1; {bit24, bit16, bit8, bit0}=a group of MSI message number 0. When the number of MSI messages is 16, 4, 2 or 1, groups can be defined in the same way.

Figure 7:
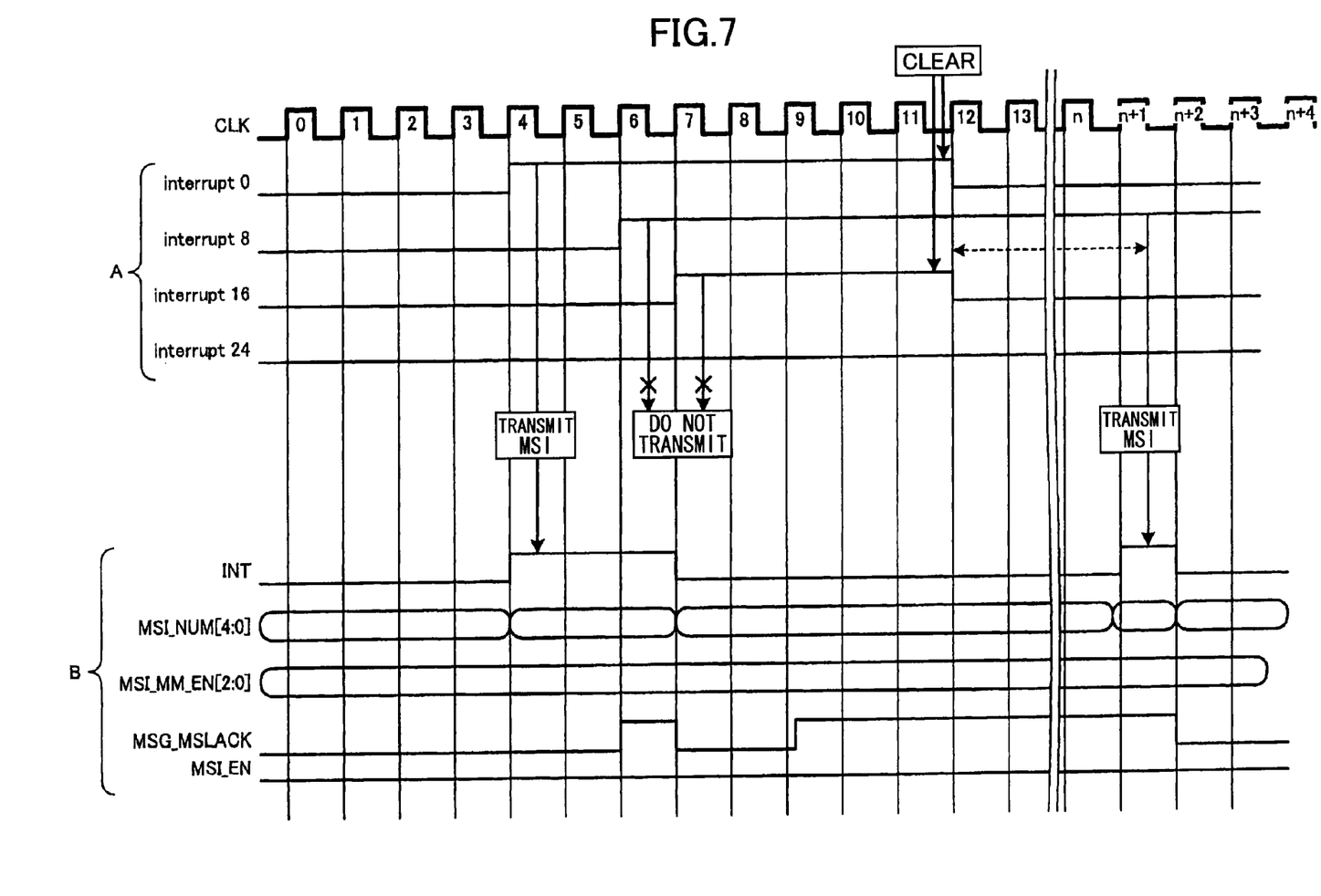
FIG. 7 shows a timing chart when performing issuing of a request of a MSI packet.

FIG. 7 shows a timing chart when sending an issuing request of a MSI packet. In the timing chart shown in FIG. 7, the timing chart A shows outputs from the status register 304 (A in FIG. 6), and the timing chat B shows outputs from the MSI requesting unit 305 (B in FIG. 6). As mentioned above, signals of {bit24, bit16, bit8, bit0} of outputs from the status register 304 share the MSI message number 0. In the following, an interrupt request from bitx (x is a number from 0 to 32) is represented as Interruptx.

As shown in the timing chart A in FIG. 7, first, Interrupt0 is asserted at CLK4. Next, Interrupt8 is asserted at CLK6, and Interrupt16 is asserted at CLK7. As shown in timing chart B, when Interrupt0 is asserted at CLK4, the MSI requesting unit 305 requests the ENDP 213 to issue a MSI packet in which the message number 0 is embedded. The MSI requesting unit 305 does not request issue of an MSI packet even though other Interrupt (Interrupt8, Interrupt16 and the like) in the same group is asserted before Interrupt0 is negated (refer to timing chart B).

In the timing chart A shown in FIG. 7, Interrupt0 and Interrupt16 are negated at the same time at CLK11. At this time, since Interrupt8 is kept asserted, the MSI requesting unit 305 requests issue of a MSI packet again after a time. That is, when any of Interrupts in a same group is being asserted at a timing when any of Interrupts in the same group is negated, the MSI request unit 305 requests issue of a MSI packet again.

As mentioned above, the MSI requesting unit 305 performs control so as not to perform, until Interrupt0 is disabled (that is, until Interrupt0 is cleared), interrupt process caused by an interrupt factor (Interrupt8) of a group the same as that of the interrupt factor of Interrupt0 other than the interrupt process by Interrupt0. In the process, as the case in which "H" (value of status register) of Interrupt0 is cleared, there is a case in which a value of the pending register corresponding to Interrupt0 is masked by a value of the mask register in addition to the case in which the interrupt factor itself is cleared (mask of interrupt is equivalent to negate of interrupt factor).

That is, the MSI requesting unit 305 can also perform control so as not to perform, until the value of Interrupt0 is masked, interrupt process caused by an interrupt factor (Interrupt8) of a group the same as that of the interrupt factor of Interrupt0.

By adopting the above-mentioned configuration, issuing of redundant MSI packets can be suppressed so that process efficiency of the PCIe bus can be improved.

However, although the above-mentioned control method is used, there is a case in which following problems occur.

First, when a plurality of factors are being asserted, and when it is necessary to clear a plurality of factors in interrupt processes, if timing of clearing the factors is out of alignment even if only slightly, a MSI packet is reissued at a timing when a factor is negated. For example, in a case where Interrupt0, 8, and 16 are asserted at the same time, assuming that it becomes necessary to clear Interrupt0, 8, and 16 simultaneously after interrupt processing (issue of MSI) is performed based on Interrupt0 as mentioned above. In this case, for example, if only a clearing timing for Interrupt8 is misaligned with respect to other factors, a issue of a MSI packet in which the message number 0 is embedded is performed again.

Second, in interrupt processes, if a factor is asserted right after the factor is cleared, there is a possibility in that a necessary MSI is not issued since the interrupt signal is not recognized to be negated. For example, in the example shown in FIG. 7, when Interrupt0 is asserted right after Interrupt0 is cleared, the MSI requesting unit 305 does not recognize that Interrupt0 that is a factor causing MSI packet transmission is cleared (negated) so that there is a possibility that suppression of MSI issue continues for Interrupt8. In this case, there is a possibility that MSI issuing for Interrupt8 is not performed.

Therefore, the INCT 212 is configured to supply an interrupt request to the MSI requesting unit 305 after masking all of factors, other than the factor causing the interrupt process first, belonging to the same group of the factor. Then, after the factor for which interrupt process is performed without masking is cleared, the mask is released.

Regarding the first problem, when it is necessary to cancel a plurality of factors simultaneously as mentioned above, the clearing can be performed during the factors are masked. Accordingly, event though the timing for clearing the factors becomes misaligned, redundant MSI issuing is not performed since the factors are masked. Therefore, issuing of useless MSI packet can be suppressed.

As to the second problem, after releasing the mask, a MSI packet issuing process can be performed based on an asserted factor. Accordingly, omission of necessary MSI packet can be avoided. After releasing the mask, when a plurality of factors (Interrupt0 and Interrupt8, for example) are being asserted, MSI issuing for a factor for which necessity of interrupt processing is highest may be performed. For example, as mentioned later, by providing priority order to each factor, MSI issuing for a factor of high priority can be performed first.

Figure 9:
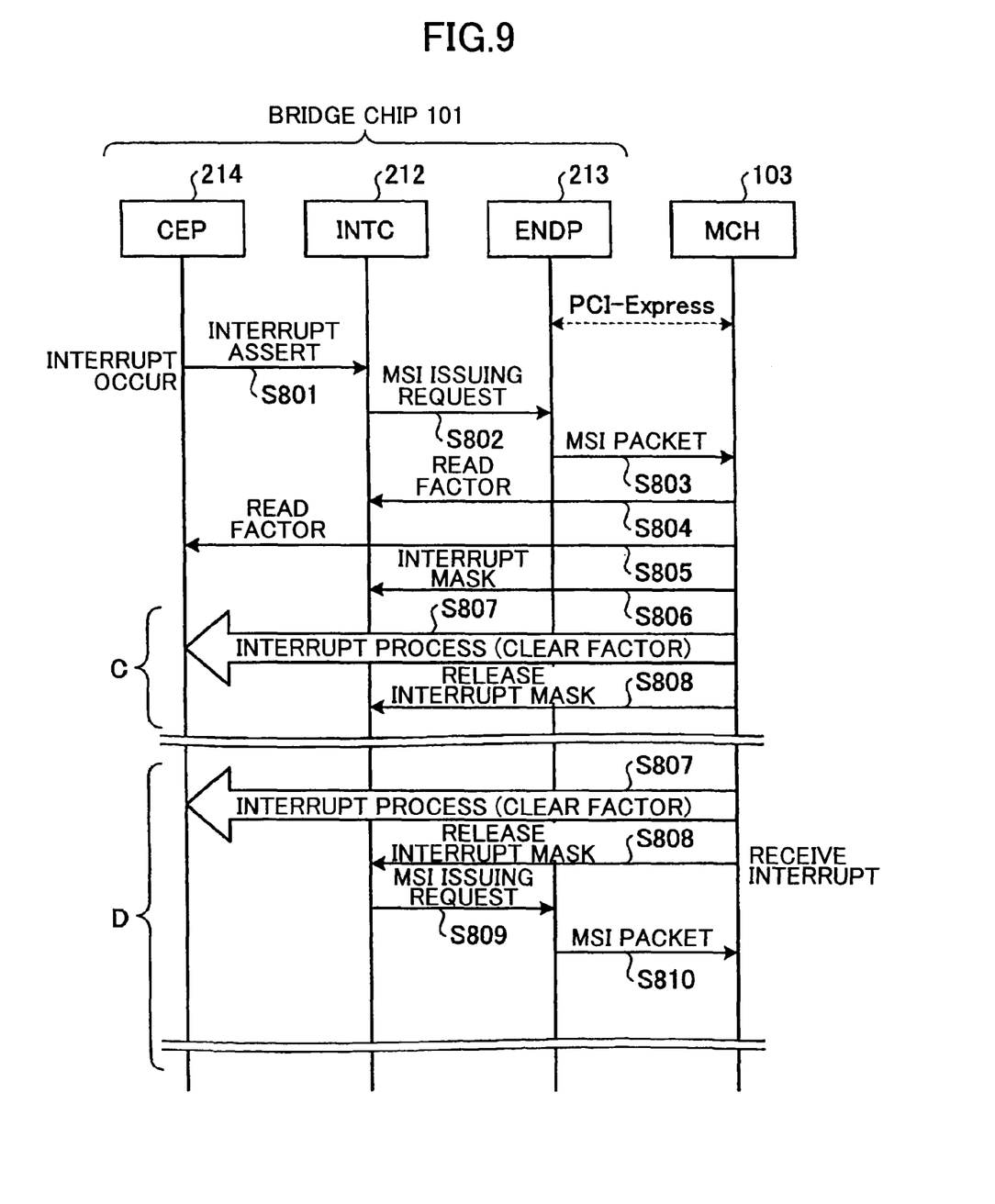
FIG. 9 is a sequence diagram showing an interrupt control process procedure when an interrupt request occurs from a function module.

By the way, processing relating to the mask is described in more detail later with reference to FIGS. 9-11.

(Initialization Process Procedure of Bridge Chip 101)

Figure 8:
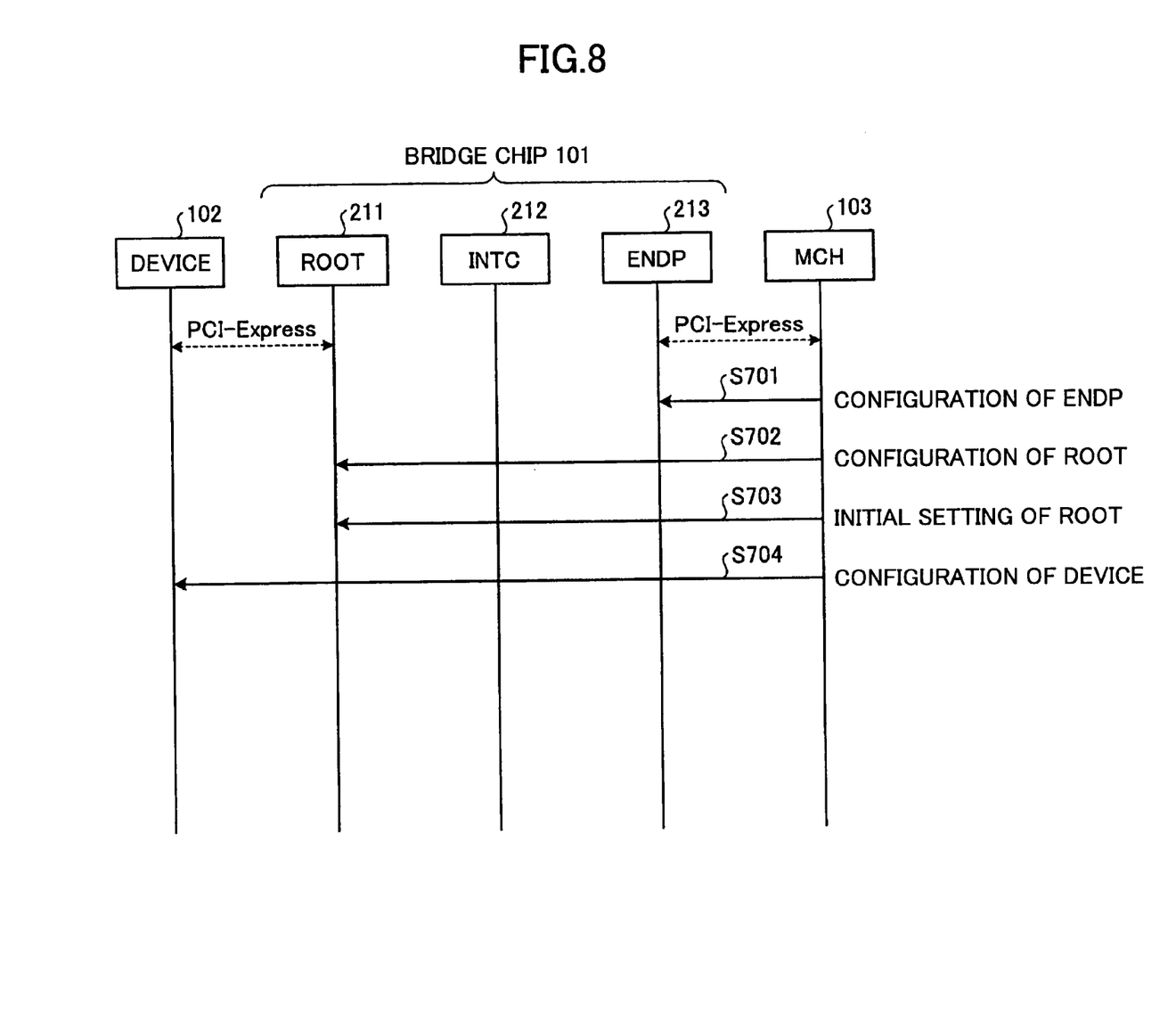
FIG. 8 is a sequence diagram showing an initialization process procedure of the bridge chip.

Next, initialization process procedure of the bridge chip 101 is described. FIG. 8 shows a sequence diagram showing the initialization process procedure of the bridge chip 101. By the way, although FIG. 8 shows that the MCH 103 accesses registers, the MCH 103 may be a chip in the CPU 104, and there is a case in which the CPU 104 is connected to an upper side of the MCH 103.

First, configuration of the ENDP 213 is performed by the MCH 103 in step S701. The configuration of the ENDP 213 is configuration related to MSI (such as setting of the number of message numbers), for example. Next, the MCH 103 performs register access to the bridge chip 101 to perform configuration of the ROOT 211 in step S702. In the configuration of the ROOT 211, setting of a base address of PCIe is performed, for example.

Next, the MCH 103 initializes inside registers of the ROOT 211 in step S703. In the inside register setting of the ROOT 211, setting for receiving a MSI packet from the device 102 is performed, for example. Then, the MCH 103 performs configuration of the device 102 in step S704. In the configuration of the device 102, setting of a base address of the PCIe is performed. According to the above-mentioned procedure, the bridge chip 101 is initialized.

(Interrupt Control Process Procedure of Bridge Chip 101)

Next, interrupt control procedure of the bridge chip 101 is described. In the present embodiment, an interrupt control process procedure when an interrupt request occurs from the function module 214 and an interrupt control process procedure when an interrupt request occurs from the device 102 are described. FIG. 9 shows a sequence diagram showing an interrupt control process procedure when an interrupt request occurs from the function module 214. In the procedure, it is assumed that the number of MSI messages is set to be 8 according to the configuration of the ENDP 213 in the initialization process of the bridge chip 101 shown in FIG. 8.

First, a CEP that is an example of the function module 214 asserts an interrupt request to the INTC 212 in step S801. The INTC 212 that receives the interrupt request from the CEP refers to a correspondence table between the number of MSI messages and message number to extract a message number corresponding to the CEP 214.

Figure 10:
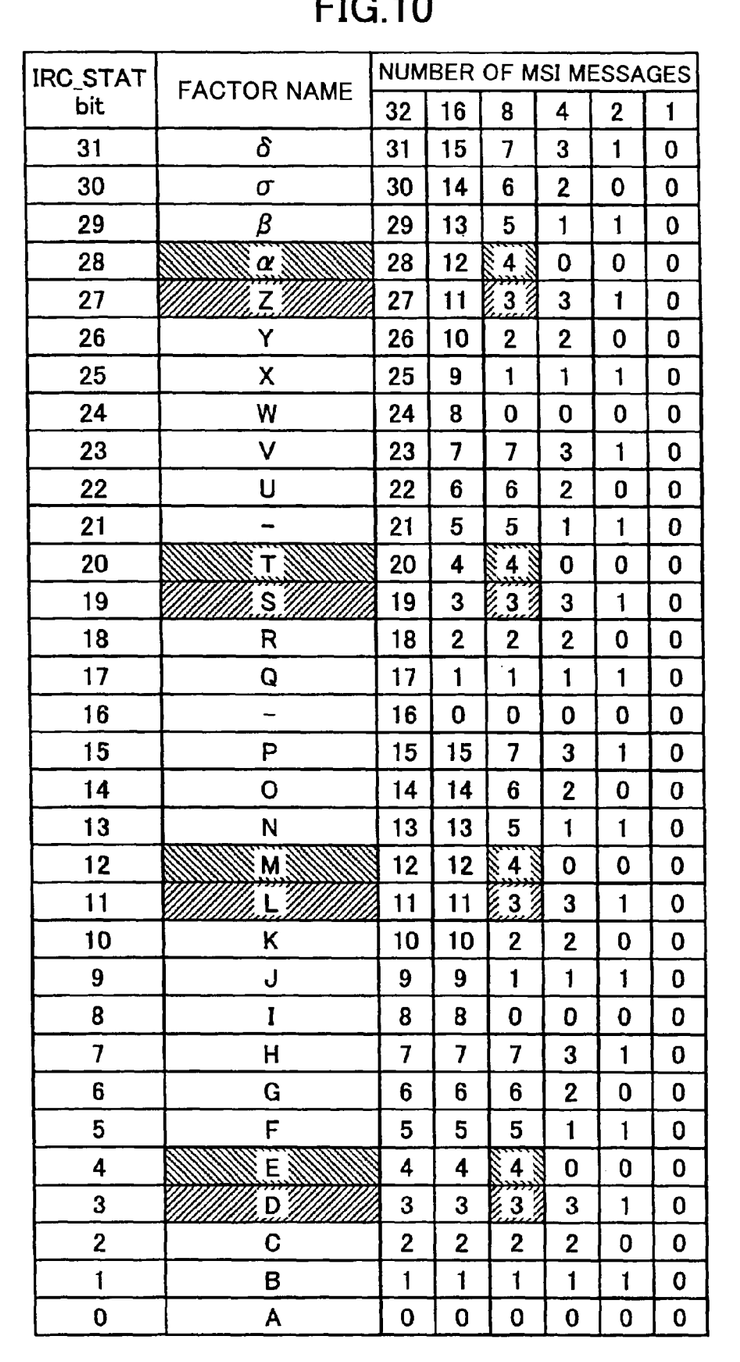
FIG. 10 is a diagram showing correspondences between MSI factor numbers and message numbers.
Figure 11:
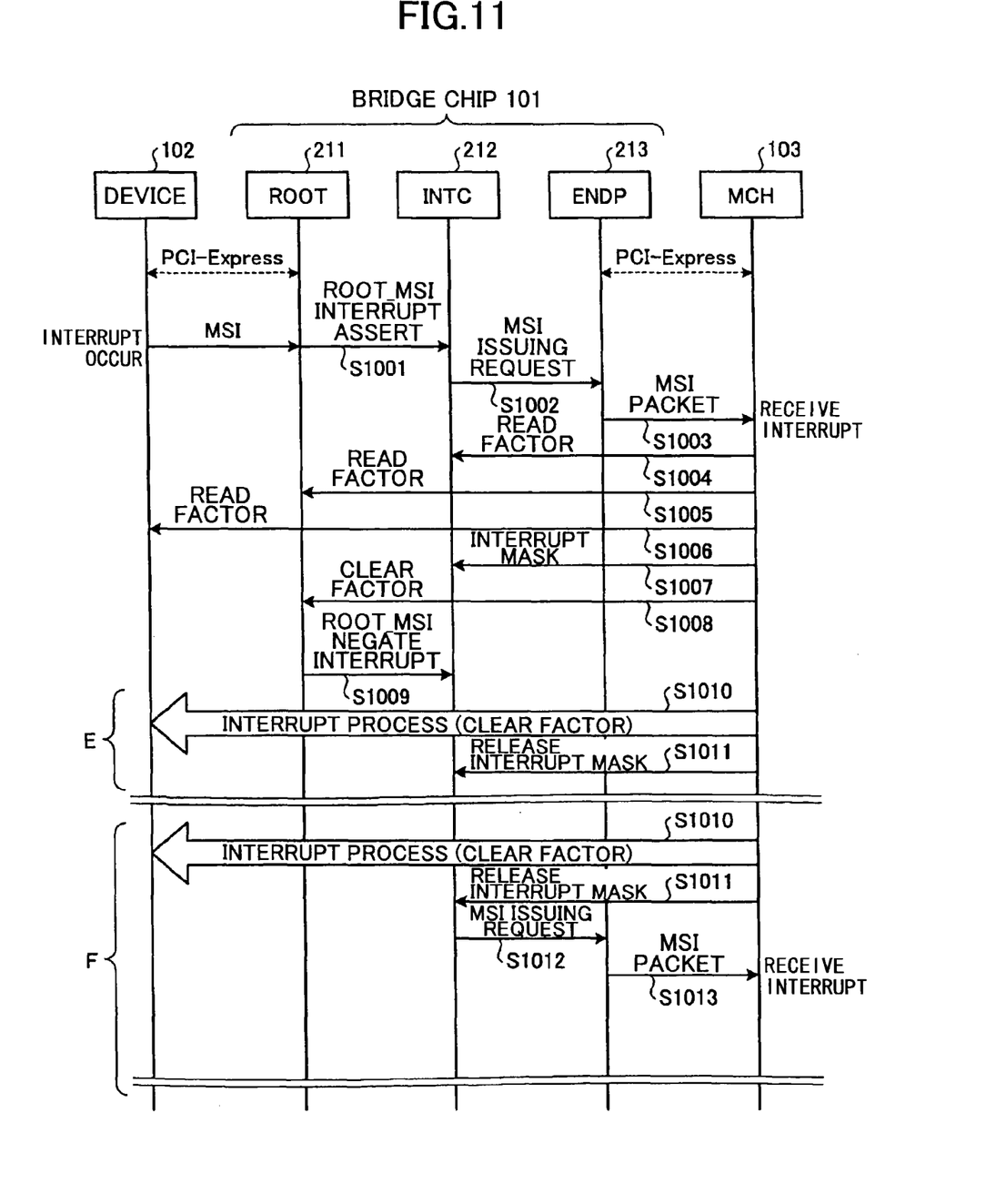
FIG. 11 is a sequence diagram showing an interrupt control process procedure when interrupt occurs from a device.

FIG. 10 is a diagram showing correspondences between MSI factor names and message numbers. In the table of FIG. 10, the values are message numbers. In the example shown in FIG. 10, when the number of the MSI messages is 8, a message number 3 is assigned to the CEP 214 (the factor name is Z in FIG. 10). Thus, the INTC 212 requests the ENDP 213 to issue a MSI packet of the message number 3 in step S802.

The ENDP 213 receives the MSI request from the INTC 212 and issues a MSI packet over the PCIe bus in step S803. The MCH 103 receives the MSI packet so that an interrupt is received. The MCH 103 that receives the MSI packet reads the status register 304 of the INTC 212 to specify that the interrupt factor is CEP in step S804. Next, the MCH 103 reads a status register of the CEP in step S805 to specify details of the interrupt factor (interrupt occurrence cause, for example). There are transfer completion and occurrence of an error as interrupt occurrence causes, for example.

Then, the MCH 103 masks all factors, other than CEP, included in a group of the message number same as the message number of CEP in step S806. For example, when the number of MSI messages is 8, there are 4 factors corresponding to the same number. In the table of FIG. 10, the factor Z (=CEP) corresponds to bit 27 of the status register 304 and to the number 3. Thus, the MCH 103 masks all factors (bit19, bit11 and bit3) grouped as the same number 3.

Next, the MCH 103 performs an interrupt process for the CEP, and clears the interrupt factor of the CEP in step S807. Then, the MCH 103 releases the mask of all of the bit19, bit11 and bit3 that were masked in step S806 (step S808). Next, the INTC 212 refers to the status register 304 to determine whether every factor (bit27, bit19, bit11 and bit3) grouped to the message number 3 is negated.

When every factor grouped to the number 3 is negated (C in FIG. 9), the process ends without sending further issuing request of the MSI packet. On the other hand, when any of the factors grouped to the number 3 is asserted (D in FIG. 9), the INTC 212 requests issuing of a MSI packet of the number 3 again in step S809. The ENDP 213 receives the MSI request from the INTC 212 and issues a MSI packet to the PCIe bus (step S810). After that, processes after the step S804 are repeated. According to the above-mentioned processes, the bridge chip 101 controls the interrupt from the function module 214.

Accordingly, when starting interrupt processes, the MCH 103 masks interrupts of the same message number at the same time. Then, after the interrupt factor is negated, all masks are released. At the time, when other factor of the same massage number is asserted, issuing of the MSI packet is automatically requested again.

Next, control processes for an interrupt request from the device 102 are described. FIG. 11 is a sequence diagram showing an interrupt control process procedure when an interrupt occurs from the device. First, a MSI packet is issued from the device 102, and the ROOT 211 asserts an interrupt request (ROOT_MSI) to the INTC 212 in step S1001. The INTC 212 that receives the interrupt request from the device refers to the correspondence table between the number of MSI messages and the message number to extract a message number corresponding to ROOT_MSI (factor T in FIG. 10). In the example of FIG. 10, when the number of the MSI messages is 8, a message number 4 is assigned to the factor T. Thus, the INTC 212 requests the ENDP 212 to issue a MSI packet of the message number 4 in step S1002.

The ENDP 213 receives the MSI request from the INTC 212 and issues a MSI packet over the PCIe bus (step S1003). The MCH 103 receives the MSI packet so that an interrupt is received. The MCH 103 that receives the MSI packet reads the status register 304 of the INTC 212 to specify that the interrupt factor is a lower module (device 102) of the ROOT 211 in step S1004. Next, the MCH 103 reads a status register of the device 102 and a status register of the ROOT 211 in steps S1005 and S1006 to specify details of the interrupt factor.

Then, the MCH 103 masks all factors, other than ROOT_MSI, included in a group of the message number same as the message number of ROOT_MSI in step S1007. For example, when the number of MSI messages is 8, there are 4 factors corresponding to the same number. In the table of FIG. 10, the factor T (=ROOT_MSI) corresponds to bit20 of the status register 304 and to the number 4. Thus, the MCH 103 masks all factors (bit28, bit12 and bit4) grouped to the same number 4. Next, the MCH 103 clears the interrupt factor of the ROOT_MSI in step S1008. Next, the ROOT 211 negates the interrupt request (ROOT_MSI) for the INTC 212 in step S1009.

Next, the MCH 103 performs interrupt process for the device 102, and clears the interrupt factor of the device 102 in step S1010. Then, in step S1011, the MCH 103 releases the mask of all of the bit28, bit12 and bit4 that were masked in step S1006. Next, the INTC 212 refers to the status register 304 to determine whether every factor (bit28, bit20, bit12 and bit4) grouped to the number 4 is negated.

When every factor grouped to the number 4 is negated (E in FIG. 11), the process ends without sending further issuing request of the MSI packet. On the other hand, when any of the factors grouped to the number 4 is asserted (F in FIG. 11), the INTC 212 requests issuing of MSI packet of the number 4 again in step S1012. The ENDP 213 receives the MSI request from the INTC 212 and issues a MSI packet to the PCIe bus in step S1013. After that, processes after the step S1004 are repeated. According to the above-mentioned processes, the bridge chip 101 controls interrupts from the device 101.

Accordingly, when there is an interrupt request of a factor, the MCH 103 masks all factors grouped to the message number same as that of the factor. For example, in an control example in which interrupt process is performed after only one factor of factors grouped to the same message number is masked, issue of a MSI packet is requested again if a factor in the same group is being asserted at the time of masking. In addition, when interrupt process in which a plurality of factors are cleared is performed, if the timing of clearing the factors is misaligned even if only slightly, reissue of an MSI packet for a factor that is not masked is requested. On the other hand, according to the present embodiment, since all factors that are grouped in a same message number are masked, redundant issue of the MSI packet can be suppressed so that processing efficiency of the PCIe bus can be improved.

By the way, when a plurality of interrupt requests are detected at the same time, the INCT 212 can request issuing of MSI packet according to a predetermined priority order. In this case, the priority order can be determined based on the message number of the interrupt request or bit number of the status register 304. Which is used between the message number or the bit number of the status register 304 for setting the priority order is determined based on the method of grouping the message numbers, for example.

When the priority order is provided for the interrupt request, the INCT 212 executes an interrupt request of the highest priority among received interrupt requests. At this time, the INCT 212 masks interrupt requests from interrupt factors having priority lower than that of the executed interrupt factor among interrupt factors to which a message number the same as one for the executed interrupt request is assigned.

When the priority order is determined based on the message number, priority of a message number 7 is set to be the highest, and priority of a message number 0 is set to be the lowest, for example. In this case, from a sate in which all factors are negated, when the MSI requesting unit 305 detects Interrupt 12 (message number 4) and Interrupt 24 (message number 0) at the same time, the MSI requesting unit 305 requests the ENDP 213 to issue a MSI packet of the message number 4 first, then, requests the ENDP 213 to issue a MSI packet of the message number 0.

When the priority order is determined based on the bit number of the status register 304, priority of a bit number 31 is set to be the highest, and priority of a bit number 0 is set to be the lowest, for example. In this case, from a sate in which all factors are negated, when the MSI requesting unit 305 detects Interrupt 12 (message number 4) and Interrupt 24 (message number 0) at the same time, the MSI requesting unit 305 requests the ENDP 213 to issue a MSI packet of the message number 0 first, then, requests the ENDP 213 to issue a MSI packet of the message number 4.

In addition, the INCT 212 may be configured to set priority among factors to which a same message number is assigned. If the INCT 212 cannot set priority for factors among a same group, a MSI packet of the same message number is issued only once until any of the factors are cleared. That is, there is a problem in that, after reading a factor of the status register 304 first in interrupt handling, even if an interrupt of the same message number occurs, the CPU 104 cannot detect the interrupt.

When the INCT 212 is configured to be able to set priority order for factors in a same group, when the MSI requesting unit 305 detects an interrupt factor having priority higher than a currently requesting interrupt, the MSI requesting unit 305 issues a MSI packet of the same message number again. Accordingly, even when a number of the message numbers is less than the number of interrupt factors, multiplex interrupt control can be performed. For example, even when only 8 kinds of message numbers can be used due to restriction of the MCH 103 (upper chip) although there are 32 kinds of interrupt factors of a lower device, efficient processing can be performed by the multiplex interrupt control.

As mentioned above, during interrupt process is being performed based on a MSI packet including a message number, the bridge chip 101 of the present embodiment does not issue other MSI packet including the message number.

Accordingly, redundant issue of the MSI packet can be suppressed so that performance of the device can be improved.

In addition, according to the bridge chip 101 of the present embodiment, an interrupt request signal masked by the mask register 303 is supplied to the MSI requesting unit 305. Accordingly, each factor can be cleared in the interrupt process after masking interrupts to be processed, and the mask can be released. Therefore, according to the bridge chip 101 of the present embodiment, issue of useless MSI packet can be suppressed, and omission for issuing a necessary MSI packet can be avoided.

In addition, according to the bridge chip 101 of the present embodiment, when there is an interrupt request based on a factor, all factors grouped in a message number the same as that of the factor are masked. Accordingly, redundant issue of the MSI packet can be suppressed so that process efficiency of the PCIe bus can be improved.

In addition, according to the bridge chip 101 of the present embodiment, since interrupt process caused by an interrupt factor having high priority can be executed first, performance of the system can be improved. In addition, according to the bridge chip 101 of the present embodiment, multiplex interrupt processing among interrupt factors corresponding to a same message number can be performed.

In the present embodiment, although an example in which buses of the PCIe standard are connected with each other (PCIe-PCIe bus switch) is described, the present invention can be also applied to a case in which buses of the PCI standard are connected with each other. In addition, the present invention can be also applied to a case in which a bus of the PCIe standard and a bus of the PCI standard are connected with each other (PCIe-PCI bus bridge).

The interrupt control method described in the present embodiment can be realized by executing a program that is prepared beforehand using a computer such as a personal computer and a workstation. The program is stored in a computer readable recording medium such as a hard disk, a flexible disk, a CD-ROM, a MO and a DVD, so that the program is read from the recording medium and is executed. In addition, the program can be distributed via a network such as the Internet.

As mentioned above, the interrupt control apparatus, the bus bridge, and the interrupt control method and the like relating to the present invention are applicable for systems for transmitting an interrupt request using a packet (including edge interrupt in a broad sense). More particularly, they are applicable for a chip set including a PCIe bus, a PCIe-PCIe bus switch, a PCIe-PCI bus bridge, a multi-functional chip set including the bus switch or bus bridge function, a printer controller and an I/O chip.

As mentioned above, according to an embodiment of the present invention, an interrupt control apparatus that controls an interrupt process request caused by a predetermined interrupt factor is provided. The interrupt control apparatus includes:

an obtaining unit configured to obtain an interrupt process request signal including an interrupt factor identifier associated with at least equal to or more than two interrupt factors;

an interrupt process unit configured to execute an interrupt process requested by the interrupt process request signal; and a control unit configured to control the interrupt process unit so as not to execute interrupt processes caused by interrupt factors associated with the interrupt factor identifier until the interrupt process executed by the interrupt process unit ends.

According to this first configuration, during the interrupt process caused by the interrupt factor associated with the interrupt factor identifier is being executed, interrupt processes caused by interrupt factors associated with the same interrupt factor identifier are not executed. Accordingly, redundant interrupt process can be suppressed so that performance of the device can be improved.

In the above first configuration, the control unit may control the interrupt process unit so as not to execute interrupt processes caused by interrupt factors associated with the interrupt factor identifier until an interrupt request of the interrupt process request signal is disabled.

According to this second configuration, during the interrupt process caused by the interrupt factor associated with the interrupt factor identifier is being executed, interrupt processes caused by interrupt factors associated with the same interrupt factor identifier are not executed. Accordingly, redundant interrupt process can be suppressed so that performance of the device can be improved.

In the above first configuration, the control unit may control the interrupt process unit so as not to execute interrupt processes caused by interrupt factors associated with the interrupt factor identifier until an interrupt request of the interrupt process request signal is masked.

According to this third configuration, during the interrupt process caused by the interrupt factor associated with the interrupt factor identifier is being executed, interrupt processes caused by interrupt factors associated with the same interrupt factor identifier are not executed. Accordingly, redundant interrupt process can be suppressed so that performance of the device can be improved.

In the first to third configurations, when the obtaining unit obtains the interrupt process request signal, the control unit may mask all interrupt process request signals caused by interrupt factors associated with the interrupt factor identifier included in the interrupt process request signal, and the control unit releases the mask after the interrupt process ends.

According to this fourth configuration, redundant interrupt process can be suppressed so that performance of the device can be improved. In addition, it can be avoided that, when an interrupt is masked, an interrupt process caused by the same interrupt factor identifier is performed. In addition, it can be avoided that, in a case for performing a process for clearing a plurality of interrupt factors at the same time, an interrupt process is executed when an interrupt factor that is not masked is cleared.

In the first to fourth configurations, when the obtaining unit obtains a plurality of interrupt process request signals of interrupt factors associated with a same interrupt factor identifier at the same time, the control unit may control the interrupt process unit so as to perform interrupt processes based on predetermined priority order.

According to this fifth configuration, since an interrupt process caused by an interrupt factor having high priority can be executed preferentially, performance of the system can be improved.

In the fifth configuration, when the obtaining unit obtains an interrupt request signal having priority higher than the interrupt process that is being performed by the interrupt process unit, the control unit may control the interrupt process unit so as to perform an interrupt process based on the interrupt request signal having the higher priority.

According to this sixth configuration, multiplexed interrupt processes among interrupt factors associated with a same interrupt factor can be performed.

In the fifth configuration, the control unit may mask interrupt process request signals having priority lower than that of an interrupt process request signal having highest priority among a plurality of interrupt process request signals obtained at the same time, and releases the mask after the interrupt process ends.

According to this seventh configuration, redundant interrupt process can be suppressed so that performance of the device can be improved. In addition, it can be avoided that, when an interrupt factor is masked, an interrupt process caused by the same interrupt factor identifier is performed. In addition, it can be avoided that, in a case for performing a process for clearing a plurality of interrupt factors at the same time, an interrupt process is executed when an interrupt factor that is not masked is cleared.

In the first to seventh configuration, the interrupt process request may be an interrupt process request between devices connected by buses of the PCI-Express standard, connected by buses of the PCI standard, or connected by a bus of the PCI-Express standard and a bus of the PCI standard, the interrupt factor identifier may be a MSI message number, and the interrupt process may be performed by issuing a MSI packet.

According to the eighth configuration, execution of redundant interrupt process can be suppressed so that performance of the device can be improved between devices connected by buses of the PCI-Express standard, connected by buses of the PCI standard, or connected by a bus of the PCI-Express standard and a bus of the PCI standard.

Also, according to embodiments of the present invention, a bus bridge including the above-mentioned interrupt control apparatus and a bus switch including the above-mentioned interrupt control apparatus can be provided. In addition, according to embodiments of the present invention, an image processing apparatus including the interrupt control apparatus and an image processing unit can be provided.

According to these configurations, during the interrupt process caused by an interrupt factor associated with an interrupt factor identifier is being executed, interrupt processes caused by interrupt factors associated with the same interrupt factor identifier are not executed. Accordingly, redundant interrupt process can be suppressed so that performance of the device can be improved.

Also, according to an embodiment of the present invention, an interrupt control method performed by an interrupt control apparatus for controlling an interrupt process request caused by a predetermined interrupt factor is provided. The method includes:

an obtaining step of obtaining an interrupt process request signal including an interrupt factor identifier associated with at least equal to or more than two interrupt factors; and an interrupt process step of executing an interrupt process requested by the interrupt process request signal, wherein, in the interrupt process step, the interrupt control apparatus does not execute interrupt processes caused by other interrupt factors associated with the interrupt factor identifier during the interrupt control apparatus is executing the interrupt process.

According to the configuration, during the interrupt process caused by an interrupt factor associated with an interrupt factor identifier is being executed, interrupt processes caused by interrupt factors associated with the same interrupt factor identifier are not executed. Accordingly, redundant interrupt process can be suppressed so that performance of the device can be improved.

The present invention is not limited to the specifically disclosed embodiments, and variations and modifications may be made without departing from the scope of the present invention.

The present application contains subject matter related to Japanese patent applications No. 2008-113974, filed in the JPO on Apr. 24, 2008, No. 2007-324627, filed in the JPO on Dec. 17, 2007, and No. 2007-121129, filed in the JPO on May 1, 2007, the entire contents of which being incorporated herein by reference.

What is claimed is:

1. An interrupt control apparatus that controls an interrupt process request, comprising:
    an obtaining unit configured to obtain and register interrupt factors and to transmit an interrupt process request signal including an interrupt factor identifier associated with two or more interrupt factors, based on the registration of one of the two or more interrupt factors associated with the interrupt factor identifier;
    an interrupt process unit configured to execute an interrupt process requested by the interrupt process request signal; and
    a control unit configured to control the obtaining unit, before a mask of interrupt factors is applied, so as not to transmit interrupt process request signals based on registered interrupt factors associated with the interrupt factor identifier other than the one registered interrupt factor, until an interrupt associated with the interrupt process ends.

2. The interrupt control apparatus as claimed in claim 1, wherein
    the control unit controls the obtaining unit so as not to transmit interrupt processes based on registered interrupt factors associated with the interrupt factor identifier other than the one registered interrupt factor, until one or more of the registered interrupt factors are cleared and the mask of interrupt factors is released.

3. The interrupt control apparatus as claimed in claim 1, wherein
    the control unit controls the obtaining unit so as not to transmit interrupt processes based on registered interrupt factors associated with the interrupt factor identifier other than the one registered interrupt factor, until the mask of interrupt factors is applied and released.

4. The interrupt control apparatus as claimed in claim 1, wherein,
    when the obtaining unit transmits the interrupt process request signal, the control unit masks all interrupt process request signals caused by interrupt factors associated with the interrupt factor identifier included in the interrupt process request signal, and the control unit releases the mask after the interrupt process ends.

5. The interrupt control apparatus as claimed in claim 1, wherein,
    when the obtaining unit registers a plurality of interrupt factors associated with a same interrupt factor identifier at the same time, the control unit controls the obtaining unit so as to process the transmission of interrupt process request signals based on a predetermined priority order.

6. The interrupt control apparatus as claimed in claim 5, wherein,
    when the obtaining unit registers an interrupt factor having a priority higher than an interrupt factor for which an interrupt process request signal was transmitted, the control unit controls the obtaining unit so as to transmit an interrupt process request signal based on the interrupt factor having the higher priority.

7. The interrupt control unit as claimed in claim 5, wherein the control unit masks interrupt factors having priority lower than that of an interrupt factor having highest priority among a plurality of interrupt factors registered at the same time, and releases the mask after the interrupt process ends.

8. The interrupt control apparatus as claimed in claim 1, wherein
the interrupt process includes transmission of an interrupt packet between devices connected by buses of the PCI-Express standard, connected by buses of the PCI standard, or connected by a bus of the PCI-Express standard and a bus of the PCI standard;
the interrupt factor identifier is a message signaled interrupt (MSI) message number, and
the interrupt packet is an MSI packet.

9. A bus bridge comprising the interrupt control apparatus as claimed in claim 1.

10. A bus switch comprising the interrupt control apparatus as claimed in claim 1.

11. The interrupt control apparatus as claimed in claim 1, wherein
the mask of interrupt factors masks each interrupt factor associated with the interrupt factor identifier other than the one registered interrupt factor.

12. An image processing apparatus comprising an image processing unit and an interrupt control apparatus that controls an interrupt process request, the interrupt control apparatus comprising:
an obtaining unit configured to obtain and register interrupt factors and to transmit an interrupt process request signal including an interrupt factor identifier associated with two or more interrupt factors, based on the registration of one of the two or more interrupt factors associated with the interrupt factor identifier;
an interrupt process unit configured to execute an interrupt process requested by the interrupt process request signal; and
a control unit configured to control the obtaining unit, before a mask of interrupt factors is applied, so as not to transmit interrupt process request signals based on registered interrupt factors associated with the interrupt factor identifier other than the one registered interrupt factor, until an interrupt associated with the interrupt process ends.

13. An interrupt control method performed by an interrupt control apparatus for controlling an interrupt process request, comprising:
an obtaining step of obtaining and registering interrupt factors and transmitting an interrupt process request signal including an interrupt factor identifier associated with two or more interrupt factors, based on the registration of one of the two or more interrupt factors associated with the interrupt factor identifier;
an interrupt process step of executing an interrupt process requested by the interrupt process request signal wherein; and
controlling, before a mask of interrupt factors is applied, the obtaining step so as not to transmit interrupt process request signals based on registered interrupt factors associated with the interrupt factor identifier other than the one registered interrupt factor, until an interrupt associated with the interrupt process ends.

* * * * *